Feb. 6, 1940.   R. STEVENSON   2,189,686
COMBINATION FLUID SEAL AND BEARING
Filed April 6, 1937   3 Sheets-Sheet 1
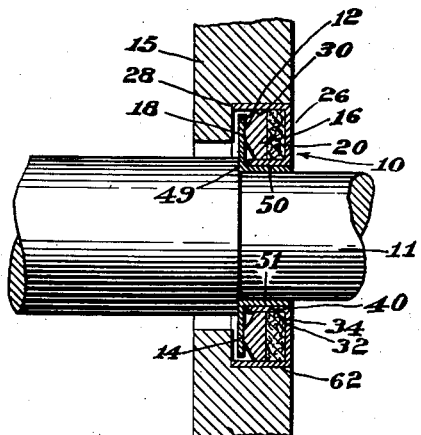
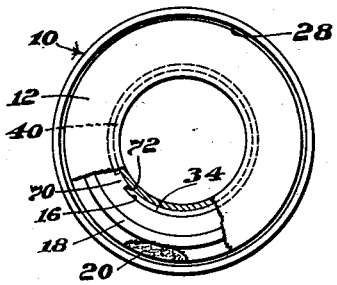
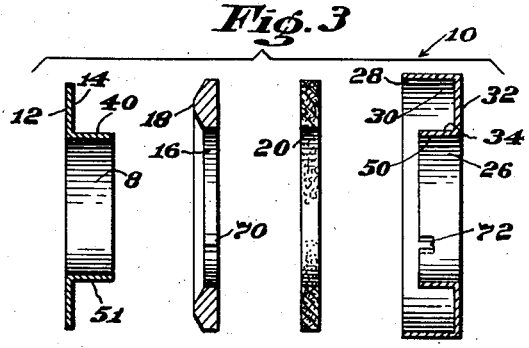
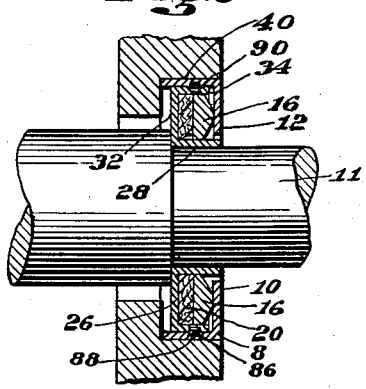
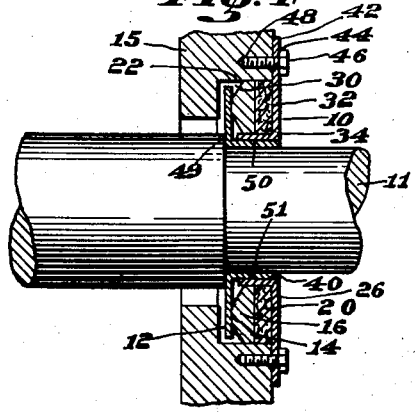
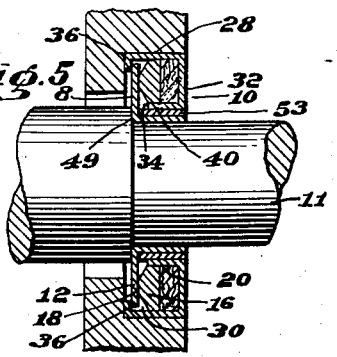
Inventor
Robert Stevenson,
By Thomas A. Jenkins
Attorney Feb. 6, 1940.     R. STEVENSON     2,189,686
COMBINATION FLUID SEAL AND BEARING
Filed April 6, 1937     3 Sheets-Sheet 2
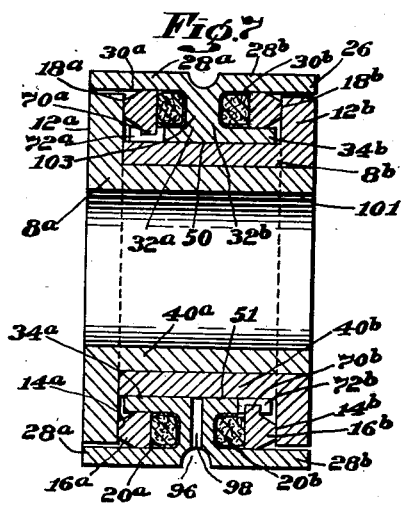
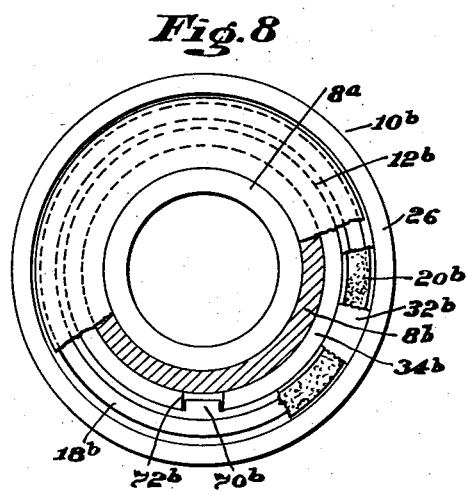
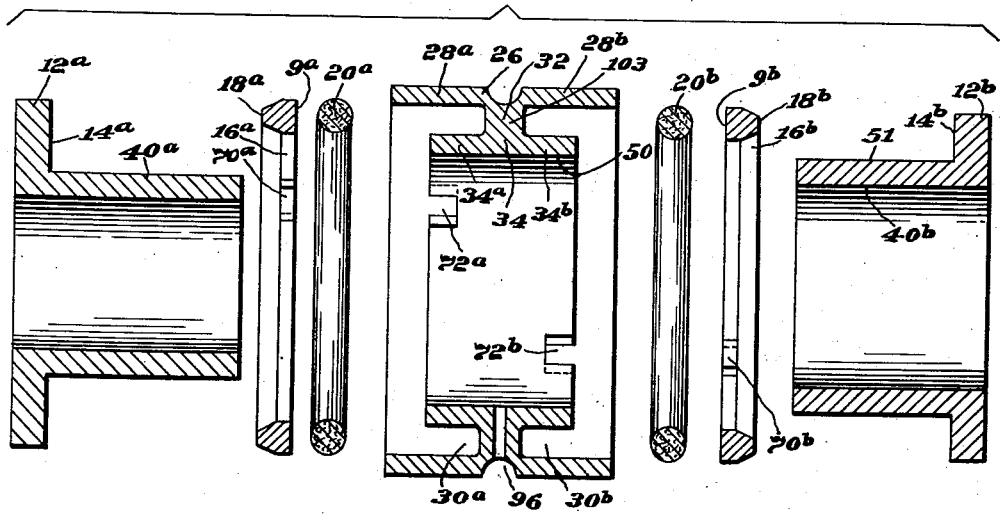
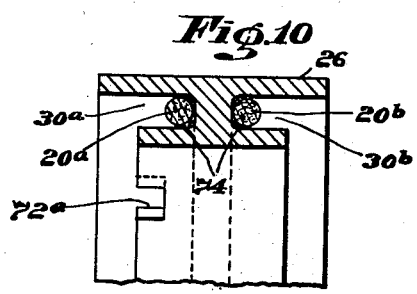

Feb. 6, 1940. R. STEVENSON 2,189,686
COMBINATION FLUID SEAL AND BEARING
Filed April 6, 1937 3 Sheets-Sheet 3
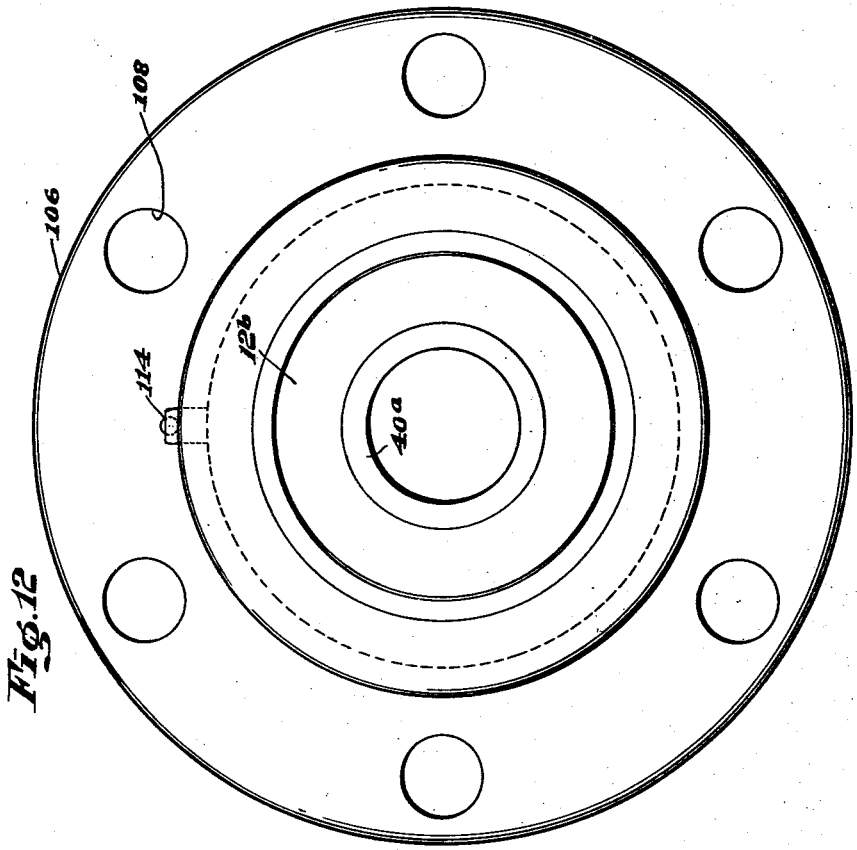
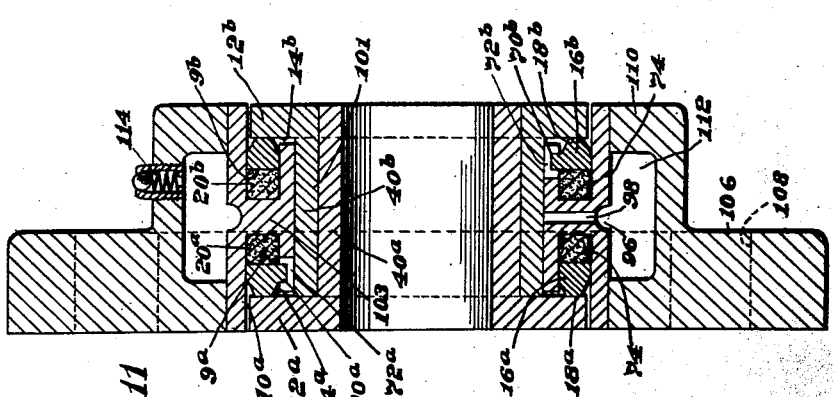
Inventor
Robert Stevenson
By Thomas A. Jenkins
Attorney Patented Feb. 6, 1940

2,189,686

UNITED STATES PATENT OFFICE 2,189,686

COMBINATION FLUID SEAL AND BEARING

Robert Stevenson, West Barrington, R. I., assignor to Sealol Company, a corporation of Rhode Island Application April 6, 1937, Serial No. 135,301

12 Claims. (Cl. 308—36.2)

This invention relates to improvements in oil or fluid seals, and particularly to a seal having incorporated therein a radial bearing, the combination being adapted for use with parts designed for relative rotation, as with a shaft and housing construction.

An object of this invention is to provide a seal having a minimum number of simple parts, which is at all times positive in its action, the oil seal having one or more parts which act as elements of a radial friction bearing.

A further object of my invention is to provide a seal and radial bearing which may be sold either as an assembled self-contained unit for easy attachment to a shaft and housing construction, as by insertion between radially spaced concentric surfaces thereof, or which may be sold as a group of parts ready for assembly and attachment thereto. To this end, my invention may conveniently take the form of a double oil seal and radial bearing combination, which, while manufactured as a group of parts which may be sold as such, may be readily pre-assembled and sold in a unitary self-contained assembled form, ready for attachment to the shaft and housing construction. The same unitary assembled device may be mounted within a hub, and the entire hub may be thus sold as a pre-assembled, self-contained radial bearing unit having incorporated therein positive oil seal.

These and such other objects of my invention as may hereinafter appear, will be best understood from a description of the accompanying drawings, in which, Fig. 1 is a longitudinal sectional view taken through a housing and shaft construction, showing an embodiment of my invention in section, the shaft being shown in elevation;

Fig. 2 is a face view of the oil seal and bearing unit shown in Fig. 1 with parts broken away;

Fig. 3 is a disassembled sectional view of the various parts of the oil seal of Figs. 1 and 2;

Fig. 4 is a sectional view similar to Fig. 1 showing a modified form of my invention;

Fig. 5 is a sectional view showing a further modified form of my invention;

Fig. 6 is a sectional view showing another form of my invention;

Fig. 7 is a sectional view of a unitary self-contained double oil seal radial bearing construction;

Fig. 8 is a face view of the unit shown in Fig. 7;

Fig. 9 is a disassembled sectional view of the various parts of the unit shown in Figs. 7 and 8;

Fig. 10 is a detailed sectional view showing two of the parts of Fig. 9 in mounted relation;

Fig. 11 is a longitudinal sectional view of the unit of Fig. 7 mounted in a hub; and Fig. 12 is a face view of the device shown in Fig. 11.

Referring to the drawings, wherein like reference characters indicate like parts throughout, 10 generally indicates an oil seal constructed in accordance with the invention of my co-pending application, Serial No. 135,300, but, in addition, having incorporated therein a radial friction bearing, the combination seal and radial bearing being adapted for use between a shaft 11 and a housing 15. This combination seal and bearing may be used either with a shaft revolving within the housing or with a housing revolving about the shaft.

As shown in Fig. 1, my oil seal and radial bearing may be mounted between concentric, radially spaced surfaces of the shaft and housing, which are conveniently supplied with a shoulder 49 and counterbore 62 respectively for the reception of the bearing and oil seal.

As described in my co-pending application, the oil seal may comprise four elements, as shown in Fig. 3. Rigidly seated on the surface of the shaft 11 and abutting shoulder 49 for accurate assembly is the annular part 8, having a collar portion 40 and a flange portion 12 projecting radially therefrom and having on one side thereof a bearing surface 14, which may be ground, polished, or otherwise finished. The collar portion 40 is provided with an axially extending bearing surface 51 for a purpose to be described.

Rigidly mounted in the counterbore 62 of the housing 15 for rotation therewith relative to the flanged element 8 is an assembly including a sealing ring 16, a compressible resilient oil or fluid impervious ring 20, and a mounting member 26.

The sealing ring 16 has on one side thereof a reduced portion, preferably tapered, to form a comparatively narrow, flat metal surface 18, which is preferably ground, polished, or otherwise finished, and adapted in use to circumferentially bear against the surface 14 of the flange 12 to provide a positive oil seal at all times. As shown, the sealing ring is of a substantial width axially to provide adequate wear allowance.

As shown in Fig. 1, the sealing ring 16 is mounted for axial movement within a recess 30 of the member 26. This member 26 comprises an annular cup-shaped member having a side wall 28, adapted to be driven with a press fit into the counterbore 62 in housing 15, and a radial wall 32 and an inner axial wall 34, the three walls forming a recess 30 which faces the flange 12. The wall 32 is of such radial width that the axial wall 34, provided with an inner bearing surface 50, forms a radial friction bearing against the surface 51 of the collar 40. The wall 34 has axial clearance with the flange 12.

To continuously force the bearing surface 18 of the sealing ring 16 against the bearing surface 14 of the flange 12, I interpose between the sealing ring 16 and the radial wall 32 resilient means comprising, in my preferred form, an oil or fluid impervious compressible ring 20, constructed of cork, rubber, fabric, plastic, or any other suitable, compressible, resilient composition, preferably one which is vulcanizable. Among others there are such compositions marketed under the names "Duprene", "Corprene", or "Thiacol."

When the seal is assembled with mounting member 26 flush with the end of the housing bore, as shown, the compressible resilient ring 20 is compressed between the radial bearing surface 14 and the radial wall 32, so that it continuously urges the sealing ring axially toward the bearing surface 14. As shown, the ring 20 is confined against radial expansion, by the walls 34 and 28 respectively of the mounting member 26.

It will be understood that a suitable thrust bearing (not shown) is provided between the shaft 11 and housing 15 to confine these members against relative axial movement in the direction which would release the compression of resilient ring 20.

To insure that the sealing ring 16, compressed ring 20, and mounting member 26 shall rotate together to prevent friction wear of ring 20, I may provide the respective interlocking means described in my co-pending application. As shown in Figs. 2 and 3, a projection 70 is provided on sealing ring 16 projecting radially into a slot 72 formed in wall 34 of mounting member 26.

Fig. 4 illustrates a modified form of my invention. In this construction the collar portion 40 is mounted on the shaft 11 abutting against the shoulder 49 of the shaft, the flange 12 having radial and axial clearance with the housing member 15, as shown. The mounting member 26 is constructed with a radial wall 32 having a portion 42 extending radially beyond the bore of the housing 15, and, in assembling, the mounting member 26 may be attached to the housing as by means of bolts 46 passing through appropriate apertures 44 formed in extension 42 and into appropriate threaded bores 48 formed in the housing 15. As thus fastened, the wall 34 of the mounting member 26 has an inner annular surface 50 which may be properly ground to form a radial bearing with the outer axial surface 51 of collar 40, the latter acting functionally as a bearing surface on the shaft 11, as shown. At the same time, the mounting member 26 holds the metal sealing ring 16 against the bearing surface 14 of the flange 12 through the interposition of the compressed ring 20, which is confined in this case against radial expansion by the bore surface 22 functioning as the equivalent of wall 28 in Fig. 1.

In the form shown in Fig. 5, a separate annular flat bearing ring 53 is interposed between the collar 40 and the axial wall 34, the mounting member 26 being suitably modified as by shortening the length of radial wall 32. As will be readily understood, bearing ring 53 may be rigidly secured to either axial wall 34 or collar 40 as by a press fit so that the radial bearing may be provided as desired either between suitably finished surfaces of wall 34 and ring 53 or of collar 40 and ring 53.

As also illustrated in Fig. 5, provision is made so that the parts 8, 16, 20 and 26 may be held against separation prior to attachment between the shaft 11 and housing 15. As shown, wall 28 of member 26 is extended beyond the end of flange 12 of member 8 so that wall 28 may be spun over flange 12 or otherwise inturned as shown at 36. This portion 36 may be formed either to merely hold the parts together or to place ring 20 under compression. Preferably, operating compression on ring 20 is caused by the act of assembling with the shaft and housing. In such case, the portion 36 in the act of compressing ring 20, will be moved away from flange 12 to prevent frictional contact between portion 36 and flange 12 which might be undesirable in many cases.

In the forms illustrated in Figs. 4 and 5 a thrust bearing (not shown) is provided between shaft 11 and housing 15, as explained in connection with Fig. 1, to maintain resilient ring 20 compressed, if end 36 does not operate for this purpose.

Fig. 6 illustrates a form of my invention wherein the oil seal parts shown in Fig. 3 have been reversed, the construction being such that the part 8 (collar 40 and flange 12) which is secured to rotate with the shaft 11 in Fig. 1, is suitably modified for attachment to the housing 15; and the assembly which is secured to rotate with the housing in Fig. 1 (sealing ring 16, compressible ring 20 and member 26) is suitably modified for attachment to the shaft 11. In this form, the radial friction bearing is formed, as shown, between the oil seal part 34 and the collar portion 40.

Fig. 6 also illustrates a form of my oil seal and radial bearing unit which may be preassembled or precompressed and sold as a self-contained unit ready for attachment to the shaft and housing. To this end, a split interlocking ring 86 is inserted in suitable grooves 88 and 90 formed in collar 40 and wall 34 respectively, such ring acting as a thrust bearing to prevent separation of the unit. An anti-friction ball or other type of thrust bearing can be substituted if desired.

Fig. 7 illustrates an assembled pre-compressed unit, ready for attachment between concentric radially spaced surfaces of a shaft and housing. As shown, in this form, I provide a double oil seal, and the unit consists essentially in a combination of two of the units shown in Fig. 1, arranged end to end and facing in opposite directions. This unit includes inner and outer tubular or bearing members 101 and 26, the inner bearing member comprising telescoping sleeves 8$^a$ and 8$^b$, the inner telescoping sleeve 8$^a$ being adapted to be secured to a shaft by a press fit. Telescoping sleeves 8$^a$ and 8$^b$ comprise respective collar portions 40$^a$ and 40$^b$ provided with integral flanges 12$^a$ and 12$^b$ at opposing ends thereof. Collar portion 40$^b$ on outer sleeve 8$^b$ has on its external surface a finished bearing surface 51.

The outer tubular or bearing member consists of a mounting member 26 for the oil seals and is adapted to be secured to a housing member, as by insertion in a bore thereof by a press fit. This outer tubular member includes an external cylindrical portion formed by axial walls 28$^a$ and 28$^b$ and an internal cylindrical portion formed by axial walls 34$^a$ and 34$^b$, the portions being connected centrally by a radial web 103. The internal surface of walls 34ª and 34ᵇ of the internal cylindrical portion are properly ground to form a bearing surface 50 adapted to bear against the bearing surface 51 of collar portion 40ᵇ.

The external and internal cylindrical portions and connecting web form oppositely facing recesses 30ª and 30ᵇ. Seated in these recesses are sealing rings, such as 16ª and 16ᵇ, preferably having reduced sides forming narrow flat bearing surfaces 18ª and 18ᵇ, adapted to be sealed against bearing surfaces 14ª and 14ᵇ on flanges 12ª and 12ᵇ.

Interposed between the other surfaces 9ª and 9ᵇ of the sealing rings 16ª and 16ᵇ and the radial web 103 are resilient means 20ª and 20ᵇ, which may take the form of the preferred compressible resilient ring described in connection with Fig. 1.

As shown, the outer tubular member 26 may be provided with a peripheral groove 96 and radial passageway 98 leading to the bearing surfaces 50 and 51 for conducting oil thereto.

The described parts are so proportioned that collars 40ª and 40ᵇ may be telescoped to compress the sealing units between web 103 and the respective flanges 12ª and 12ᵇ to maintain both oil seals in compression. For this purpose, as shown, the internal cylindrical portion 34ª, 34ᵇ of bearing member 26 is of shorter length axially than the external cylindrical portion 28ª, 28ᵇ, so that there is axial clearance between the internal cylindrical portion and the flanges 12ª and 12ᵇ. Each of the flanges 12ª and 12ᵇ are formed to have radial clearance with the external cylindrical portions 28ª and 28ᵇ of bearing member 26. As shown in Fig. 9, suitable interlocking means such as projections 70ª and 70ᵇ on rings 16ª and 16ᵇ respectively, radially received in slots 72ª and 72ᵇ in walls 34ª and 34ᵇ respectively may be provided to insure positive rotation or fixation of parts 16ª and 16ᵇ and bearing and mounting member 26. As shown in Fig. 10, vulcanization or similar treatment may be provided to secure rings 16ª and 16ᵇ in recesses 30ª and 30ᵇ of outer bearing member 26, as at 74. Similar securing means may be provided in connection with all forms of my invention.

The unit exemplified by Fig. 7 as thus compressed to embody a self-contained combination double oil seal and radial bearing, is shown in Fig. 11 mounted in a hub 106, having an annular recess or chamber 112 formed in an axially extending portion 110. The hub may be provided with suitable means 114 for supplying oil to the annular chamber 112, and as shown in Fig. 11, with suitable holes 108 (Fig. 12) for attachment purposes. The combination bearing and double oil seal shown in Fig. 7 is mounted as shown in Fig. 11 with a press fit into the hub member 106, and as thus embodied, may be sold as an assembled self-contained hub unit ready for attachment to a shaft.

In all forms, I prefer that my bearing surfaces 14 and 18 be made of different metals, such as bronze or brass and steel, as set forth in my co-pending application; but as also set forth in my co-pending application, other compositions or substances having similar non-resilient properties and of comparable hardness may be used in forming either surface. Both in the specification and in the appended claims, therefore, the word "metal" is used with this broader connotation and is included merely to distinguish relatively soft compositions having wearing qualities inferior to metal, for example, leather, cork, and rubber.

It is apparent that the bearing surfaces 14 and 18 may be respectively carried by the shaft 11 or housing 15; that, as illustrated, various means may be employed to confine the ring 20 against radial expansion; that, as illustrated, various means may be employed to retain the oil seal in operative compressed form or in pre-compressed or self-contained form, when that feature is desired, as the inturned flange 86, the split ring 86, the interfitting sleeves 8ª and 8ᵇ, the balls of a ball bearing as shown in my co-pending application aforesaid, other types of thrust bearing, or other suitable means; and that the positions of the various parts of my improved assembly including particularly the cups 30ª and 30ᵇ and the co-operating flange surfaces 14 and 18 may be respectively reversed or inverted or respectively moved in relatively different axial directions for compression purposes if desired. It is to be understood that these and further modifications may be made without departing from the spirit and scope of the invention as set forth in the appended claims.

My invention thus provides a simple combination oil seal and radial bearing construction, in which the oil seal is always positive in its action, and which permits of a pre-assemblage for marketing in a self-contained form, readily mounted into operative position.

This application is a continuation in part of my prior co-pending application No. 77,695, filed May 4, 1936.

I claim:

1. A combination oil seal and bearing for use between shaft means and relatively rotatable housing bore means containing said shaft means, said shaft means and housing bore means having axially extending surfaces, and being secured against relative axial movement in one direction, comprising a collar adapted to be secured to one of said means and having an axial wall and a flange projecting radially therefrom, said flange having an annular finished bearing surface on a side wall thereof, a cup-shaped ring having a surface of a side wall thereof adapted to be secured to the other of said means to have the hollow interior of the cup thereof axially face said radial bearing flange, resilient oil seal means contained within said cup to continuously bear in use against said flange bearing surface to continuously function as an oil seal as said bearing surfaces wear in use, and retain said shaft means and housing bore means against relative axial movement in the opposite direction, the free axially extending wall of said cup axially overlapping and bearing radially against the axial wall of said collar to supplementally form a bearing.

2. A combination oil seal and bearing comprising relatively rotatable inner and outer bearing members adapted to be respectively secured to a shaft and a housing bore for said shaft, said members having cooperating axially extending bearing surfaces, one of said bearing members having oppositely axially facing annular recesses, resilient oil seal means contained within said recesses, and flanges associated with the other of said members, said flanges having bearing surfaces adapted to abut said oil seal means, the construction and arrangement being such that said flanges may be axially moved relative to said recesses to lock said oil seal means in compressed position with the axially extending bearing surface of one of said members bearing radially against the axially extending bearing surface of the other of said members.

3. An oil seal bearing unit adapted for attachment to relatively rotatable parts, comprising concentric telescoping sleeves, flanges on said sleeves presenting spaced oppositely facing radial metal bearing surfaces, and an assembly mounted for rotation relative to said bearing surfaces, said assembly including rings having metal oil seal bearing surfaces adapted to abut said radially presented bearing surfaces, a mounting member for said rings having a radial wall and an axial wall, said radial wall being axially spaced from and intermediate said radially presented bearing surfaces, said axial wall confining said rings against radial movement, and resilient means adapted to be compressed between said radial wall and said oil seal rings to force said oil seal rings in opposing directions axially against said radially presented bearing surfaces, said axial wall having a bearing surface adapted to form a radial bearing with one of said sleeves.

4. A combination oil seal and radial bearing for shaft and housing members having concentric radially-spaced surfaces, comprising a collar fixed to one of said members, said collar having an axial wall and a flange projecting radially therefrom, said flange having a finished oil seal bearing surface on a side wall thereof, a cup-shaped ring fixed to said other member with a radial wall thereof at a spaced axial distance from said flange, with the hollow interior of the cup facing said bearing surface, and with one axial wall of said cup forming a radial bearing with the axial wall of said collar, a solid oil impervious resilient ring in compressed form contained within said cup, and a metal sealing ring having an outer bearing surface axially forced by said compressed ring against said flange bearing surface, the construction and arrangement being such that said resilient ring is placed under compression by the act of assembly, whereby said compressed ring expansibly continuously forces said sealing ring bearing surface against said flange bearing surface to continually function as an oil seal as said bearing surfaces wear in use.

5. A self-contained, pre-compressed combination oil seal and bearing, comprising an annular member adapted to be rigidly secured within a housing bore, said annular member including an external cylindrical portion and an internal cylindrical portion of lesser axial length joined by a radial web to form outwardly facing annular recesses between said cylindrical portions, a radial hole extending through said web, resilient oil seal means contained within each recess, an inner sleeve adapted to be rigidly secured to a shaft contained within said housing, a flange on said sleeve having a finished annular bearing surface thereon for abutment of one of said oil seal means, an outer sleeve rigidly secured telescopically with said inner sleeve, and a flange on said outer sleeve having a finished annular bearing surface thereon for abutment of the other oil seal means, said outer sleeve and said internal cylindrical portion having axially extending surfaces co-operating to form a radial bearing.

6. A self-contained, pre-compressed combination oil seal and bearing, comprising an annular member adapted to be rigidly secured within a housing bore, said annular member including an external cylindrical portion and an internal cylindrical portion of lesser axial length joined by a radial web to form outwardly facing annular recesses between said cylindrical portions, resilient oil seal means contained within each recess, an inner sleeve adapted to be rigidly secured to a shaft contained within said housing, a flange on said sleeve having a finished annular bearing surface thereon for abutment of one of said oil seal means, an outer sleeve rigidly secured telescopically with said inner sleeve, and a flange on said outer sleeve having a finished annular bearing surface thereon for abutment of the other oil seal means, said outer sleeve and said internal cylindrical portion having axially extending surfaces cooperating to form a radial bearing.

7. A self-contained, pre-compressed combination oil seal and bearing for use between rotating shaft and housing means, comprising an annular member adapted for attachment to one of said means, and telescoping sleeves adapted for attachment to the other of said means, said annular member and one of said sleeves having axial bearing surfaces cooperating to form a radial bearing, said annular member having walls forming oppositely facing annular axial recesses, annular resilient oil seal means, contained within each of said recesses, each of said sleeves having a radial flange projecting at opposing ends of said seal opposite said oil seal means, said sleeves being telescopically fixed one within the other to compress said oil seal means between said flanges and said recess-forming walls.

8. An oil seal bearing unit adapted for attachment to relatively rotatable parts, comprising telescoping sleeves, flanges on said sleeves presenting spaced oppositely facing radial metal bearing surfaces, and an assembly mounted between said bearing surfaces for rotation relative thereto, said assembly including rings having metal oil seal bearing surfaces adapted to abut said radially presented bearing surfaces, a mounting member for said rings having walls forming oppositely facing annular axial recesses facing said flanges, and annular resilient means adapted to be compressed between said recess-forming walls and said oil seal rings to force said oil seal rings in opposing directions axially against said radially presented bearing surfaces, one of said recess-forming walls having a bearing surface adapted to form a radial bearing with one of said sleeves.

9. An oil seal bearing unit adapted for attachment to relatively rotatable parts, comprising telescoping sleeves, flanges on said sleeves presenting spaced oppositely facing radial metal bearing surfaces, and an assembly mounted between said bearing surfaces for rotation relative thereto, said assembly including rings having metal oil seal bearing surfaces adapted to abut said radially presented bearing surfaces, a mounting member for said rings having walls forming oppositely facing annular axial recesses facing said flanges, and solid oil impervious resilient rings adapted to be compressed between said recess-forming walls and said oil seal rings to force said oil seal rings in opposing directions axially against said radially presented bearing surfaces, one of said recess-forming walls having a bearing surface adapted to form a radial bearing with one of said sleeves.

10. A self-contained combination oil seal and radial bearing unit comprising concentric inner and outer annular members held against separation, each of said members having a radial wall and an axial wall, said axial walls having cooperating axial surfaces forming a radial bearing between said members, said radial walls being axially spaced from each other, one of said radial walls having a finished radial bearing surface, a ring having a metal oil seal bearing surface abutting said radial bearing surface and resilient means compressed between said other radial wall and said oil seal ring to force said oil seal ring axially against said radial bearing surface, one of said annular members being adapted for attachment to a shaft and the other of said annular members being adapted for attachment to a housing for said shaft.

11. A combination oil seal and radial bearing for concentric radially-spaced surfaces on a shaft and a housing for said shaft comprising concentric inner and outer annular members, each of said members having a radial wall and an axial wall, said axial walls having cooperating axial surfaces forming a radial bearing between said members, said radial walls being axially spaced from each other, one of said radial walls having a finished radial bearing surface, a ring having a metal oil seal bearing surface abutting said radial bearing surface and resilient means compressed between said other radial wall and said oil seal ring to force said oil seal ring axially against said radial bearing surface, one of said annular members being fixed to said shaft and the other of said annular members being fixed to said housing.

12. A combination oil seal and radial bearing for concentric radially-spaced surfaces on a shaft and a housing for said shaft comprising concentric inner and outer annular members, each of said members having a radial wall and an axial wall, said axial walls having cooperating axial surfaces forming a radial bearing between said members, said radial walls being axially spaced from each other, one of said radial walls having a finished radial bearing surface, a ring having a metal oil seal bearing surface abutting said radial bearing surface and a solid oil impervious resilient ring compressed between said other radial wall and said oil seal ring to force said oil seal ring axially against said radial bearing surface, one of said annular members being fixed to said shaft and the other of said annular members being fixed to said housing.

ROBERT STEVENSON.